(12) United States Patent
Ansper et al.

(10) Patent No.: US 7,178,029 B2
(45) Date of Patent: Feb. 13, 2007

(54) METHOD AND APPARATUS FOR VALIDATING A DIGITAL SIGNATURE

(75) Inventors: Arne Ansper, Tallinn (EE); Ahto Buldas, Tallinn (EE); Meelis Roos, Tallinn (EE); Jan Villemson, Tallinn (EE)

(73) Assignee: Privador, Ltd, Tallinn (EE)

( * ) Notice: Subject to any disclaimer, the term of this patent is extended or adjusted under 35 U.S.C. 154(b) by 900 days.

(21) Appl. No.: 09/780,833

(22) Filed: Feb. 9, 2001

(65) Prior Publication Data

US 2001/0032314 A1   Oct. 18, 2001

(51) Int. Cl.
*H04L 9/00* (2006.01)
(52) U.S. Cl. .................. 713/176; 713/175; 713/181
(58) Field of Classification Search ............. 713/180, 713/176, 175, 155, 156
See application file for complete search history.

(56) References Cited

U.S. PATENT DOCUMENTS

| | | | |
|---|---|---|---|
| 6,209,095 B1* | 3/2001 | Anderson et al. | 713/176 |
| 6,314,517 B1* | 11/2001 | Moses et al. | 713/156 |
| 6,389,538 B1* | 5/2002 | Gruse et al. | 713/194 |
| 2001/0018739 A1* | 8/2001 | Anderson et al. | 713/176 |

* cited by examiner

*Primary Examiner*—Kambiz Zand
(74) *Attorney, Agent, or Firm*—Patterson & Sheridan, LLP (57) ABSTRACT

Method and system are described for validating a digital signature. More particularly, a signed message and a corresponding certificate are received. The certificate is checked for validation. A validation statement is generated, and the certificate validation and the signed message provide a status. This status represents a request for validation, and is provided along with a set of validations among which such status is an element. A digest is generated using a Merkle authentication tree corresponding to the set of validations, and this digest is signed with a private key. Accordingly, a notary may provide the signed digest, status and the set of validations for subsequent confirmation of the digital signature.

3 Claims, 9 Drawing Sheets

METHOD AND APPARATUS FOR VALIDATING A DIGITAL SIGNATURE

The present invention relates to a protocol for validating a digital signature and, more particularly, a notary protocol for validation of a digital signature.

BACKGROUND OF THE DISCLOSURE

With the increase in electronic commerce (E-C), there has been a corresponding increase in use of digitally signed documents. For example, if Barbara lends Al a sum of money, and Al digitally signs a promissory note stating that he owes Barbara that sum of money, it is in Barbara's interest that Al's digital signature is sufficient to convince a third party or parties that Al owes Barbara the stated sum. However, a dispute regarding whether Al owes Barbara any money may arise after an issuing certificate authority (CA) has revoked Al's digital signature, or more particularly public-key certificate.

A public-key certificate is a data structure having a data portion and a signature portion. Conventionally, the data portion contains text of a public key and a string of data identifying a party associated with the public key. Conventionally, the signature portion comprises a digital signature of a CA over the data portion to bind such a party's identity to such a public key.

Therefore, it would be desirable to have measures for preserving the ability to establish that a digitally signed document was digitally signed before revocation of an associated public-key certificate. Others have suggested use of a public directory to store public key information. The directory is updated by an issuing CA on a regular basis, such as daily. Content of the directory is protected with a CA's signature and also by time stamping. Thus, someone trying to prove authenticity as described above could download data from the directory to establish such authenticity. Thus, continuing our example, Barbara may check that Al's public-key certificate has not expired and is not included in a list of revoked certificates. Moreover, Barbara may check to determine if the digital signature was formed at a time when Al's public-key certificate was considered valid. Such a public directory may be maintained by a disinterested third party. However, this approach has some shortcomings, some of which are if a private key is suspected of being compromised, it is not possible to revoke a certificate until a next update of the public directory is issued. Thus, in our example, a third party using Al's private key may be signing documents as opposed to Al himself, and Al may not be able to curtail such invalid use until the public directory was updated. Another shortcoming of this approach is that as the number of certificates escalates, such a public directory may become impractically large.

Another approach suggested by others is to use an intermediary that, having received a request containing a public-key certificate, replies with a validity confirmation. Such an intermediary would sign such a validity confirmation with a private key. An example of such an on-line notary protocol 20 is shown in the flow diagram of FIG. 1.

Figure 1:
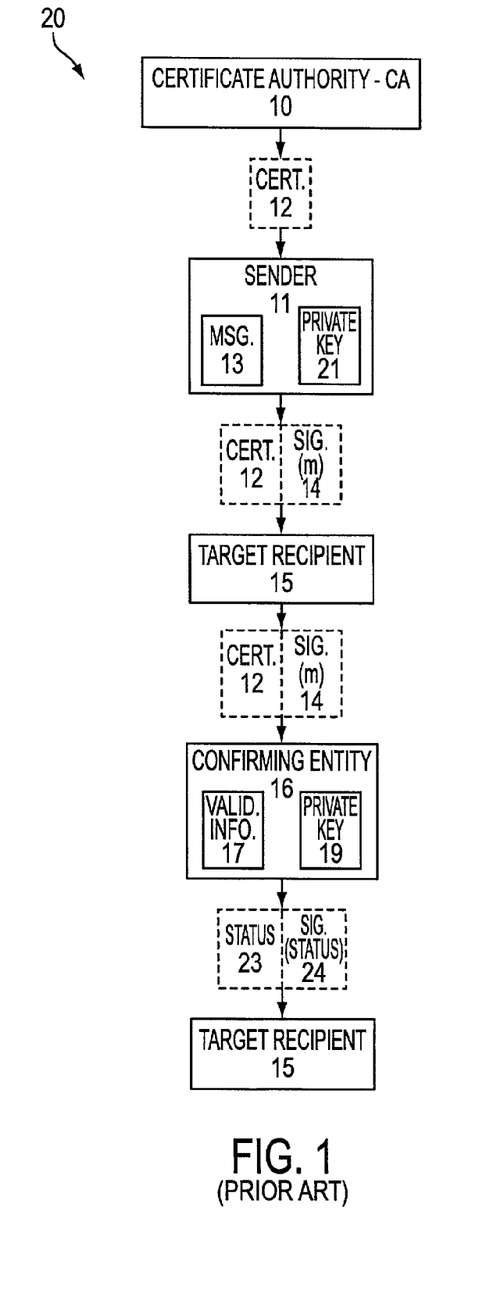
FIG. 1 is a process flow diagram of an on-line notary protocol of the prior art.

In FIG. 1, CA 10 issues certificate 12 to sender 11. Message, m, 13 is signed with a private key 21 of sender 11. Certificate 12 and signed message 14 are provided to target recipient 15. Target recipient 15 in turn provides certificate 12 and signed message 14 to confirming entity 16. Confirming entity 16 validates certificate 12. Validation or confirmation comprises verifying creation of a signed message, $Sig_S(m)$, by sender, S, 11 before a corresponding certificate, $Cert_S$, was revoked, lapsed or otherwise no longer valid.

Confirming entity 16 receives confirmation information 17 for validating certificates 12 from CA 10, such confirmation information may include a list of all active certificates having association with respective entities issued them. Thus, confirming entity 11 determines whether certificate 12 is valid. Notably, CA 10 and confirming entity 16 may be one in the same entity. Other information which CA 10 may provide confirming entity 16 may include a validity period of a public-key certificate, a serial number or key identifier identifying the certificate or public key, information about a subject entity issued the public-key certificate, among other types of information.

Confirming entity 16 provides a validation statement for certificate 12 and signed message 14, collectively referred to as status 23, to target recipient 15. Status 23 is digitally signed, $Sig_N(status_S)$, with private key 19 of confirming entity 16, and signed status 24 is provided to target recipient 15 along with status 23. Accordingly, proof is provided that message 13 was signed before confirming entity 16 signed status 23. Thus, a third party may check that: (i) signed message 14 is verifiable using a public key in certificate 12; (ii) certificate 12 is signed by CA 10; (iii) status 23 confirms validity of certificate 12; (iv) status 23 comprises signed message 14; and (v) status 23 is signed by confirming entity 16. With respect to item (v), a signature is created by confirming entity 16 of status 23 for each request by a target recipient 15. In other words, a signed reply is provided for each request on a one-to-one bases. Therefore, an informational bottleneck may result when supporting a plurality of requests for confirming signatures.

Accordingly, it would be desirable to provide for validation of a digital signature that is scalable.

SUMMARY OF THE INVENTION

An aspect of the present invention is a system for verifying a digital signature. More particularly, a first computer comprises a certificate and a signed message, and a second computer is configured to receive the certificate and the signed message. A third computer is configured to receive the certificate and the signed message from the second computer for a validation request to validate the certificate, to generate a certificate validation statement in response, and to provide an acknowledgement and a public key to the second computer. The acknowledgement comprises in part the certificate validation statement, the signed message, a first proof portion having a confirmation associated with the certificate validation statement and the signed message in combination, and a second proof portion having a signed digest having the confirmation as part of a set of confirmations.

Another aspect of the present invention is a method for validating a signature of a signed message corresponding to a certificate. More particularly, validation information is provided to a notary. If the certificate is validated, a certificate validation is created. A confirmation is generated in response to the certificate validation, and a set of confirmations is maintained where the confirmation is an element of the set. A digest is generated for the set of confirmations, and the digest is signed with a private key to create a signed digest.

The above as well as additional aspects of the present invention will become apparent in the following detailed written description.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
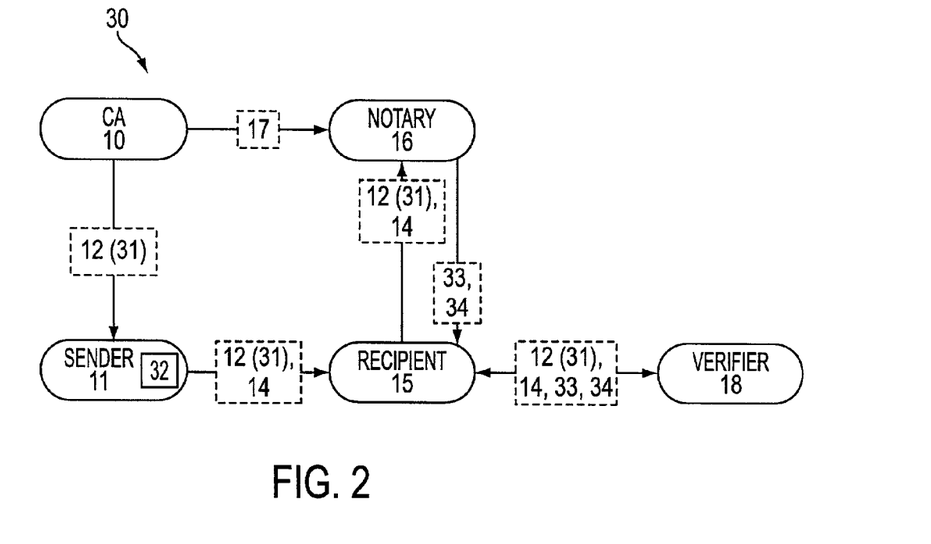
FIG. 2 is a process flow diagram of a verification system in accordance with an aspect of the present invention.

Referring to FIG. 2, there is shown a process flow diagram of a verification system 30 in accordance with an aspect of the present invention. System 30 is described in terms of a Public Key Infrastructure (PKI) but may be used with a symmetric-key infrastructure. CA 10 provides certificate 12, including public key 31, to a message originator and signer, namely sender 11, and provides validation information 17 to confirming entity or notary 16. Notably, CA 10 and notary 16 may be same or different entities. In an embodiment where CA 10 and notary 16 are under common control, an identification (ID) certificate or authorization certificate may be issued and validated under one service platform. Sender 11 signs a message, m, with senders 1's private key 32, and provides signed message 14 and certificate 12, including public key 31, to target recipient 15, which later may be an entity trying to prove origination of message, m, by sender 11.

Recipient 15 provides signed message 14 and certificate 12, including public key 31, to notary 16. Notary 16 compares validation information 17 from CA 10 against information in certificate 12 to confirm certificate 12 was issued to sender 11. Whether notary 16 confirms or denies such certificate was issued to sender 11, acknowledgement 33 of such confirmation or denial is sent to recipient 15.

If acknowledgement 33 confirms certificate 12 was issued to sender 11, acknowledgement 33 comprises status 23 (shown in FIG. 3A) and proof package 39 (shown in FIG. 3A), along with notary 16's public key 34. In case of a contest, recipient 15 may provide certificate 12 including public key 31, signed message 14, acknowledgement 33 and public key 34 to verifier 18, as judge and the like.

Figure 3A:
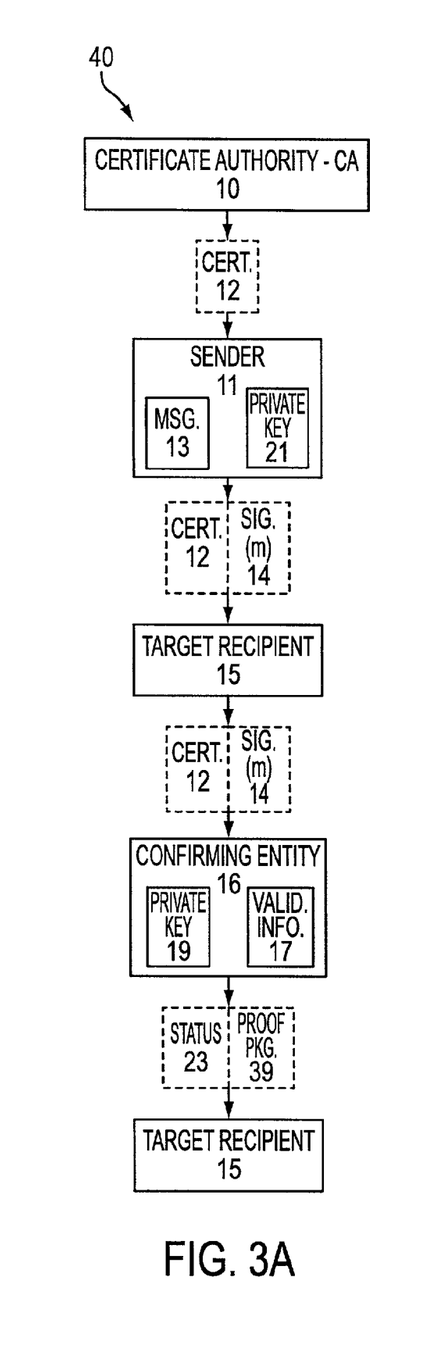
FIG. 3A is a flow diagram of an exemplary portion of a notary protocol in accordance with an aspect of the present invention.
Figure 3B:
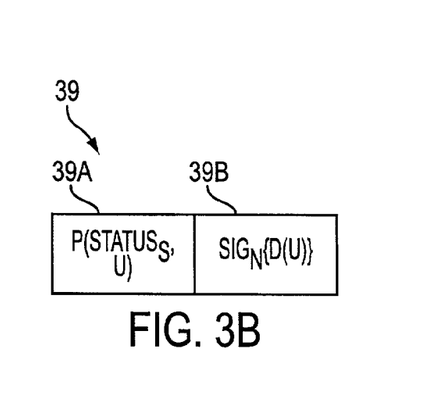
FIG. 3B is a block diagram of an exemplary portion of a proof package in accordance with an aspect of the present invention.

Referring to FIG. 3A, there is shown a flow diagram of an exemplary portion of notary protocol 40, which may be used with system 30. Notary protocol 40 is distinct from notary protocol 20 of FIG. 1, in part as notary 16 provides proof package 39 to target recipient 15 in addition to status 23. Acknowledgement 33 of FIG. 2 comprises proof package 39 and status 23. Proof package 39 comprises portion 39A, namely P(Status$_S$, U), and portion 39B, namely, Sig$_N${D(U)}, as shown in FIG. 3B and described in more detail below.

Figure 4:
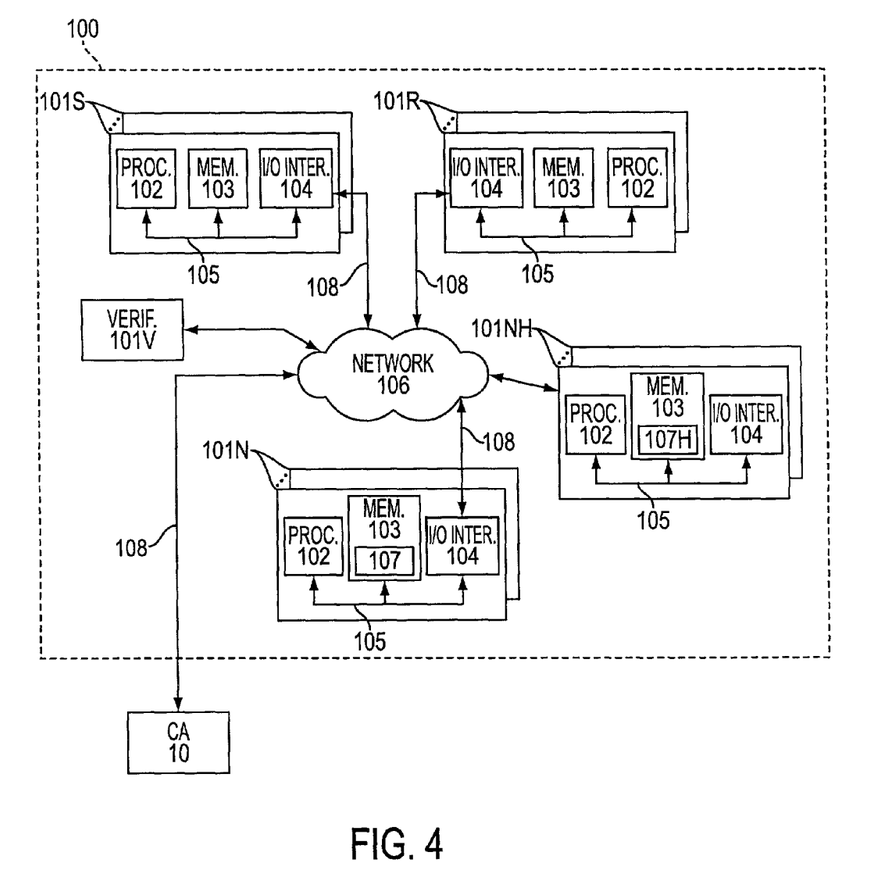
FIG. 4 is a block diagram of an exemplary network of computers in accordance with an aspect of the present invention.

Notary protocol 40 may be used in an on-line or networked computing environment. FIG. 4 is a block diagram of an exemplary network 100 of computers. Computer network 100 may be implemented using configured personal computers, workstation computers, mini computers, mainframe computers, or a distributed network of computers. However, for purposes of clarity, computer network 100 is described in terms of a network of personal computers where computers 101S represent senders 11, computers 101R represent recipients 15, computers 101N represent notaries 16, and computer 101V represents verifier 18.

Computers 101 may be configured with processor 102, input/output (I/O) interface 104, and memory 103, all of which are coupled to one another via one or more buses 105. I/O devices such as keyboards, displays, cursor pointing devices, and the like may be used with each computer 101. Each computer 101 is programmed with an operating system, which may be OS/2, Java Virtual Machine, Linux, Solaris, Unix, Windows, Windows95, Windows98, Windows NT, and Windows2000, WindowsME among other known platforms. At least a portion of operating system may be disposed in memory 103. Memory 103 may include one or more of the following random access memory, read only memory, magneto-resistive read/write memory, optical read/write memory, cache memory, thin film memory (e.g., a smart card), magnetic read/write memory, or other signal bearing media, as described below.

Computers 101 are in communication with network 106 via communication trunks or links 108, which may comprise either or both wired and wireless types of connectivity, for example such as microwave, infrared, optical, electrical wiring and radio frequency. Network 106 may comprise a local area network, wide area network or a portion of the Internet.

With continuing reference to FIG. 4, a computer 101N may be configured as a server for collecting a plurality of requests from recipient computers 101R. As mentioned above, in conventional on-line validation protocols, a server creates one signature per request, and thus such a server may be an informational bottleneck when supporting a plurality of requests for confirming signatures from clients. However, in accordance with an aspect of the present invention, one signature is used for a plurality of requests. In other words, one signature may serve several responses at a time. Computer 101N collects such requests during a time interval. This collection of requests during a time interval is referred to as a "round."

Computer 101N prepares a set, U, of corresponding response statements to such requests. These response statements are organized into a data structure 107, which data structure may be stored in memory 103. Thus, rather than signing each validation statement independently, computer 101N signs a digest, d, equal to D(U) for D a data structure 107. Accordingly, it should be understood that an entire data structure 107 representing a plurality of validation statements may be signed with a single digital signature of a computer 101N. Notably, if data structure 107 is a list of a plurality of requests for distribution to each of plurality of client computers 101R, distribution of data structure 107 may consume significant bandwidth of network 106. To avoid this, data structure 107 may be configured as a digest of such information. However, such a data structure 107 should be verifiable by a recipient computer 101R.

Figure 5:
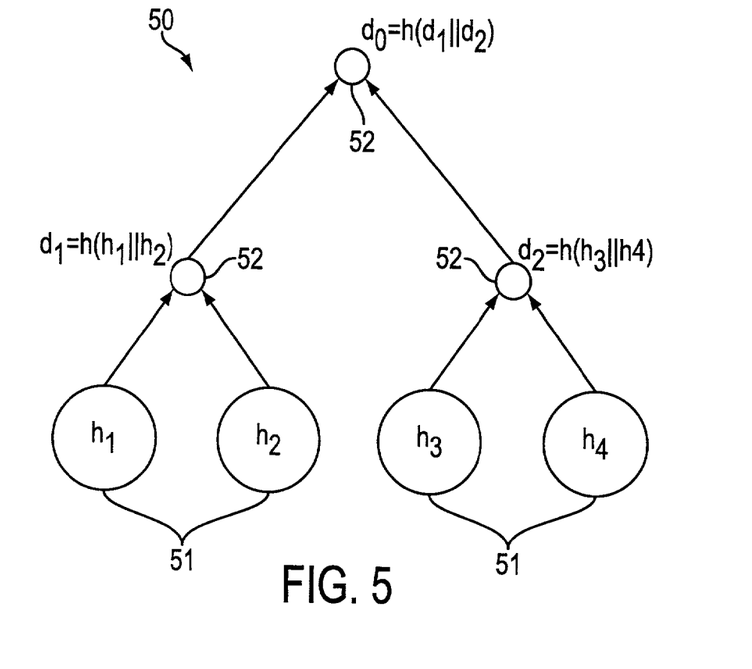
FIG. 5 is a tree diagram of an exemplary embodiment of a data structure which may be used in accordance with aspects of the present invention.

An example of a data structure having a verifiable digest is a Merkle authentication tree. An example of a four-element Merkle authentication tree 50 is shown in FIG. 5; however, fewer or more elements than four may be used. Each circle or leaf 51 represents a hash, h, of an element, i, of U or, $$h_i = h(U_i). \quad (1)$$

Each dot or vertex 52 represents a hash of a concatenation of preceding associated leaves or vertices or, $$d = h(h_i \| h_{i+1}) \quad (2)$$

or $$d = h(d_i \| d_{i+1}). \quad (3)$$

With renewed reference to FIGS. 3A and 4, and additional reference to the block diagram of proof package 39 of FIG. 3B, using a Merkle authentication tree for data structure 107, a proof portion 39A, P(U$_i$, U), is provided by computer 101N for each element or confirmation request, U$_i$ for i a positive integer, of a set, U, representing all confirmations in a "round." In this embodiment, U$_i$ is a status 23. As a plurality of requests for confirmation are processed in a round, there is an element, i, for each such request. For purposes of clarity, the notation S shall imply both a sender and an element of set U. Thus, for example, using this notation status 23 may be expressed as U$_j$=Status$_S$ for a respective request from a respective sender, S.

Each status 23 comprises a message, m, from computer 101S which is digitally signed, Sig$_S$(m), by computer 101S and comprises a validation statement of a certificate, Valid (Cert$_S$), validated by a computer 101N. In addition to status 23, computer 101N provides proof package 39 to a computer 101R. Proof package 39 comprises portion 39A, namely P(Status$_S$, U), and portion 39B, namely, Sig$_N$\{D(U)\}.

A property of a Merkle authentication tree is that P(U$_i$, U) (h(U$_i$)) equals digest, d, which is equal to D(U), where h denotes a hash function used. Thus, by providing D(U) or a signed version thereof, Sig$_N$\{D(U)\} by computer 101N verification may be made, as described below. An important property of using a Merkle authentication tree is that proof size is small, namely O(log|U|), meaning that there exists positive real numbers C and D such than for any particular value for U the proof size is less than (D+C log|U|). Accordingly, a proof of this size is more user friendly for small bandwidth applications, especially wireless communication.

Figure 6:
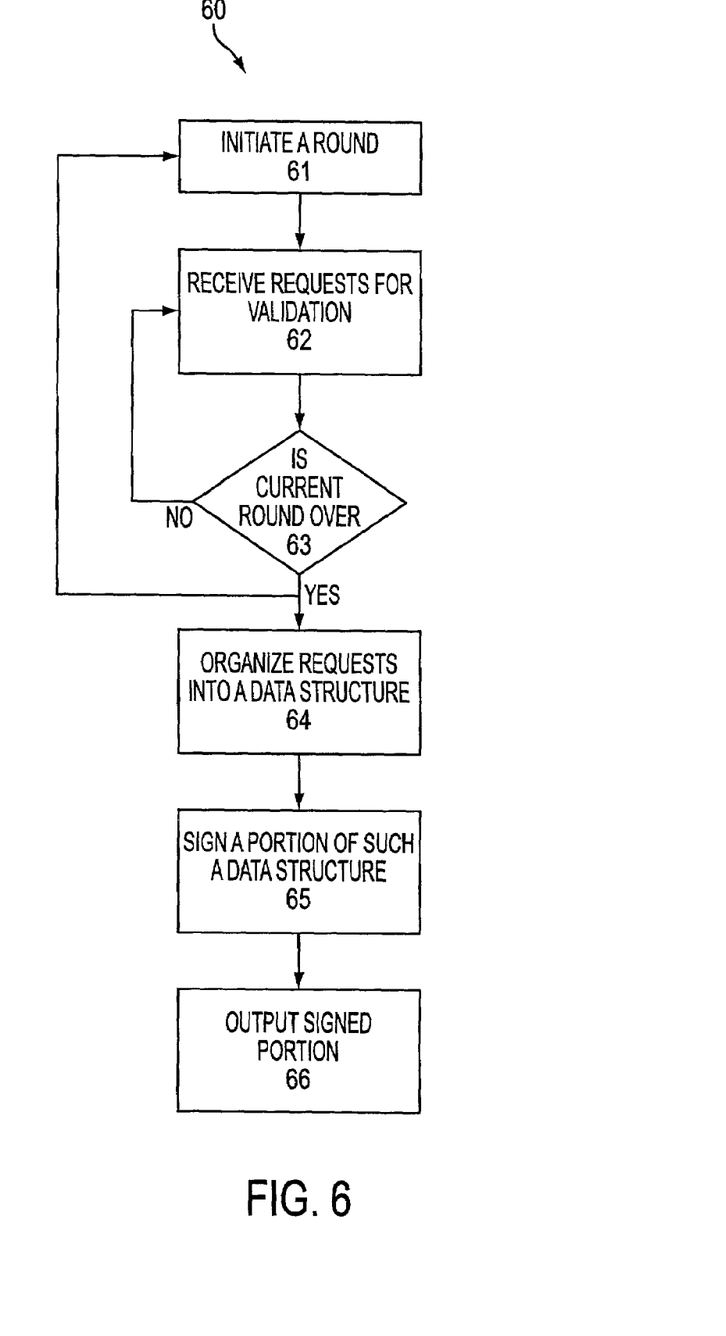
FIG. 6 is a flow diagram of an exemplary embodiment of a notary server program in accordance with an aspect of the present invention.

In FIG. 6, there is shown a flow diagram of an exemplary embodiment of a notary server program 60 in accordance with an aspect of the present invention. At step 61 a "round" is initiated. At step 62, requests for validation are received, for example from computers 101R. At step 63, a determination is made as to whether a current round has expired. For example, each round may be approximately a minute long or some other reasonable service delay. If such a current round has not expired, then requests for validation continue to be received at step 62. If, however, such a current round has expired, then at step 64, requests received at step 62 are organized into a data structure 107 (shown in FIG. 4).

Referring to FIGS. 3A, 3B, 4 and 6, at step 65 a portion of data structure 107 organized at step 64 is signed by computer 101N using private key 19. In the exemplary embodiment of a Merkle authentication tree, a root hash, namely d$_0$, is digitally signed. At step 66, such a signed portion is outputted by computer 101N. In other words, a signed digest 39B, or Sig$_N$\{D(U)\}, is outputted.

Referring again to FIG. 2, as before, a verifier 18 may check that (i) signed message 14 is verifiable using public key 31; (ii) certificate 12 is signed by CA 10; (iii) status 23 confirms validity of certificate 12; and (iv) status 23 comprises signed message 14. However, in accordance with aspects of the present invention, verifier 18 using public key 34 may further check that P(Status$_S$, U)(h(Status$_S$)) equals D(U) and that D(U) is signed by computer 101N. Accordingly, validation for a plurality of requests may be done with a single signature and resolved for each response, U$_i$, for each request, i, in a round.

Aspect of the present invention is implemented as a program product for use with a computer system such as, for example, computer 101N. Program(s) of the program product defines functions of embodiments and can be contained on a variety of signal/bearing media, which include, but are not limited to: (i) information permanently stored on non-writable storage media (e.g., read-only memory devices within a computer such as CD-ROM or DVD-RAM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the present invention, represent embodiments of the present invention.

It should be understood that as the number of requests per round increases, computational cost is reduced in accordance with an aspect of the present invention. While not wishing to be bound by theory, it is believed that if hashing is K times faster than signing and request processing by confirming entity 116 is P times faster than signing, then an increase, G, in processing speed should equal, $$G = [(1+1/P)]/[1/P+1/K+1/R], \quad (4)$$

where R is number of requests.

Moreover, the present invention may be deployed in accordance with existing on-line protocols, such as Online Certificate Status Protocol (OCSP), Time Stamping Protocol (TSP), among others, by defining new Object Identifiers (OIDs) for signatures with hash chains. An OID is a technical name for a method or algorithm. Accordingly, by adding a hash-chain to a digital signature, a new type of digital signature is provided for which a number of messages may be signed at a time thus promoting time efficiencies. This is achieved by adding additional data, namely, a hash-chain of logarithmic length, to such a signature. As a result, a new type of signature is provided which may be identified with a new OID. For example, a new type of signature, Sig', may be defined as, $$\text{Sig}'_N(\text{Status}_S) = [P(\text{Status}_S, U), \text{Sig}_N\{D(U)\}]. \quad (5)$$

Furthermore, notary protocol 40 of FIG. 3A may be used in a hierarchical PKI, where signatures of a notary 101N (shown in FIG. 4) for validity confirmation are themselves confirmed by a higher-level notary 101NH (shown in FIG. 4). Advantageously, in accordance with an aspect of the present invention, each higher-level notary 101NH server creates only one signature for each of a plurality of requests in a form of data structure 107H from client notaries 101N. Data structure 107H is similar to data structure 107, except that it is requests from client notaries that are organized as opposed to requests from client receivers of messages.

Notary Protocol with On-line Time Stamping

Figure 7:
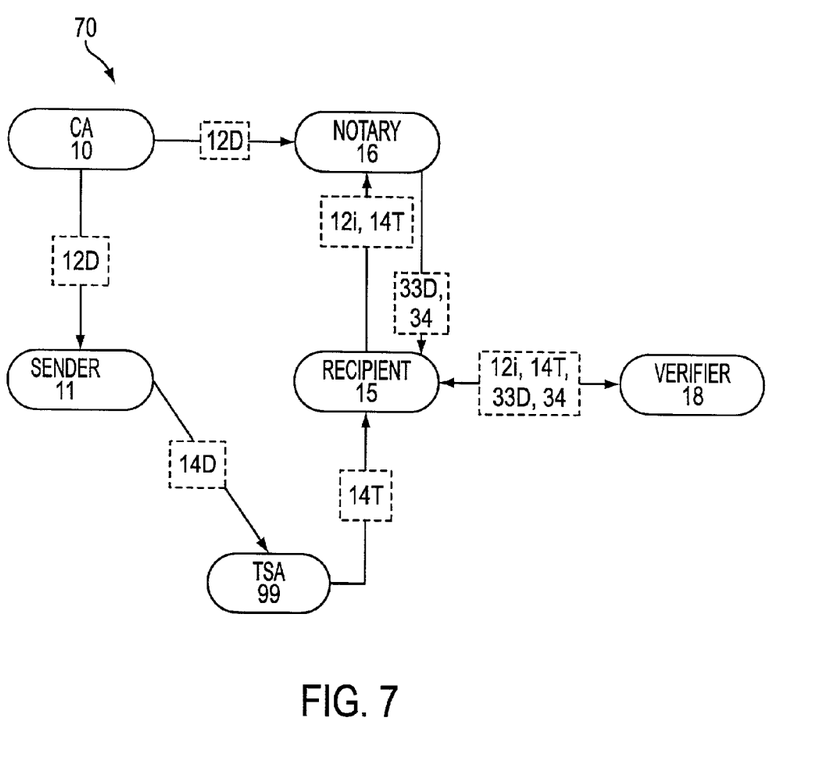
FIG. 7 is a process flow diagram of a dated certification verification system in accordance with an aspect of the present invention.

Referring to FIG. 7, there is shown a process flow diagram of a verification system 70 in accordance with an aspect of the present invention. Dated certificates 12D are provided to notary 16. Each dated certificate 12D, $\text{Cert}_S(\text{date})$, is of a form, $$(ID_S, PK_S, \text{date}), \text{Sig}_{CA}(ID_S, PK_S, \text{date}), \quad (6)$$

where $ID_S$ is identification sender 11, $PK_S$ is public key of sender 11 and date is a current date, where $\text{Sig}_{CA}$ indicates a digital signing by CA 10. In other words, sender 11's identification, public key and certificate date are signed by CA 10 as part of dated certificate 12D.

Certificates 12D may be issued on a regular and short term basis, for example daily, to senders 11. This issuance is facilitated by use of hash-tree signatures, as given by example in Equation (5). Thus, owing to using a single signature for multiple instances of certificates, CA 10 may re-issue all certificates on a daily basis and send such certificates to notary 16. Accordingly, notary 16 may update its database of certificates on a daily basis.

Sender 11 signs a message 14D using a dated certificate 12D, and sends signed message 14D to Time-Stamping Authority (TSA) 99. TSA 99 time stamps message 14D to provide time-stamped message 14T to recipient 15. Recipient 15 may send such time-stamped signed message 14T and an $ID_S$ 12i of sender 11 to notary 16.

Notary 16 may validate dated certificate 12D, $\text{Valid}(\text{Cert}_S(\text{date}))$, and provide $\text{Valid}(\text{Cert}_S(\text{date}))$ and time-stamped sign message 14T to provide a dated status, $\text{Status}_{SD}$, which status is signed by notary 16, $\text{Sig}_N(\text{Status}_{SD})$. Dated acknowledgement 33D, which comprises dated status, $\text{Status}_{SD}$, and signed dated status, $\text{Sig}_N(\text{Status}_{SD})$, along with public key 34, is provided to recipient 15. Recipient 15 may provide dated acknowledgement 33D, public key 34, time-stamped message 14, and sender identification 12 to verifier 18 to establish validity of a digital signature of sender 11.

Notary Protocol with Off-line Time Stamping

With continuing reference to FIG. 7, to avoid having an on-line TSA 99, each certificate issued by CA 10 for an i-th day $\text{Cert}_{S,i}$ may comprise a nonce value, $d_{-1}$ which is a digest, $D(\Sigma_{i-1})$, of set $\Sigma_{i-1}$, all signatures submitted during a previous day by notary 16. Such a digest is computed using a Merkle authentication tree. Accordingly, if sender 11 wants to sign a message, sender 11's certificate is added to a message to be signed, $\text{Sig}_S(m, \text{Cert}_{S,i})$.

Sender 11 may pass such a signed message and certificate to recipient 15, who in turn may pass such a signed message and certificate along with identification of sender 11 to notary 16. Notary 16 could validate sender 11's certificate and signed message and certificate, $\text{Valid}(\text{Cert}_{S,i}), \text{Sig}_S(m, \text{Cert}_{S,i})$, to provide a status. This status is signed by notary 16.

Notary 16 adds sender 11's signed message and certificate, $\text{Sig}_S(m, \text{Cert}_{S,i})$, into the set, $\Sigma_{i-1}$, of signatures. If certificates are issued on a daily basis, communication between sender 11 and recipient 15, namely at the conclusion of an i-th day, is sent by notary 16 to CA 10 in a digest form, $d_i = D(\Sigma_{i-1})$, which is a digest of signatures for such an i-th day.

In response, CA 10 time stamps such digest and signs the time stamped digest with its private key, $\text{Sig}_{CA}(\text{date}_i, d_i)$, and sends such a signed dated digest to notary 16. Because one-way links between time stamps and signatures provide proof that sender 11's signature was in fact created on an i-th day, no time-stamp services of a TSA are used. Such a one-way relationship may be expressed as, $$d_{i-1} \to \text{Cert}_{S,i} \to \text{Sig}_S(m, \text{Cert}_{S,i}) \to d_i. \quad (7)$$

Moreover, users may wait to an i-th plus one day to obtain a one-way link, namely, $$\text{Sig}_S(m) \to d_i \to \text{Cert}_{S,1+i}, \quad (8)$$

which proves validity of a signature independent of an online validation service.

Accordingly, a verifier 18, with authentic copies of public keys of CA 10 and notary 16 may check that status (certificate and message) is properly verifiable with a public key written in a certificate; such a certificate is signed by CA 10; status confirms validity of such a certificate and comprises a signed status; status is signed by notary 16; digest, $d_i$, equals proof, $P((\text{Sig}_S(m, \text{Cert}_{S,i})), \Sigma_i)(h(\text{Sig}_S(m, \text{Cert}_{S,i})))$; and $\text{Sig}_{CA}(\text{date}_i, d_i)$ is properly verifiable using a public key of CA 10. Moreover, a verifier 18, who may want to further check notary 16, may obtain a next certificate, $\text{Cert}_{S,i+1} = \text{Sig}_{CA}(ID_S, PK_S, \text{date}_{i+1}, d_i)$, and check that $\text{Cert}_{S,i+1}$ comprises a digest for an i-th day, $d_i$, and a public key of sender 11, $PK_S$. This may be used to confirm validity of a signature independent of notary 16 because if sender 11's certificate is revoked during an i-th day, CA 10 will not issue a certificate to such a sender 11 on an i-th plus one day, $\text{Cert}_{S,i+1}$.

Authorization Service

Figure 8:
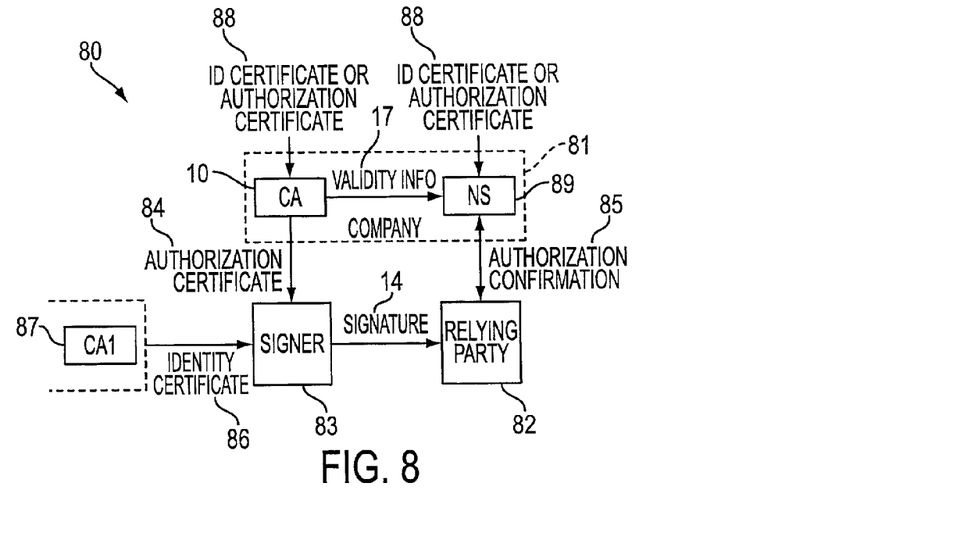
FIG. 8 is a block diagram of an authorization service in accordance with an aspect of the present invention.

Referring to FIG. 8, there is shown a block diagram of an authorization service 80 in accordance with an aspect of the present invention. Notary service 89 is used by a company 81 to confirm to relying party 82 that an employee 83, who has obtained an identity certificate 84, from a global CA, or a device 84, represented by such identity certificate 84's public key, has right to sign 14 in the name of company 81. Company 81 runs a CA 10, for issuing attribute or authorization certificates 88, and a notary service 89 for giving fast on-line confirmations 85 about validity of attribute or authorization certificates 84. Note that signer 83 may have obtained an identity certificate 86 from another CA 87 that is not owned and controlled by company 81.

Protocols described elsewhere herein may be used to provide such service 80.

Secure Registers

Figure 9:
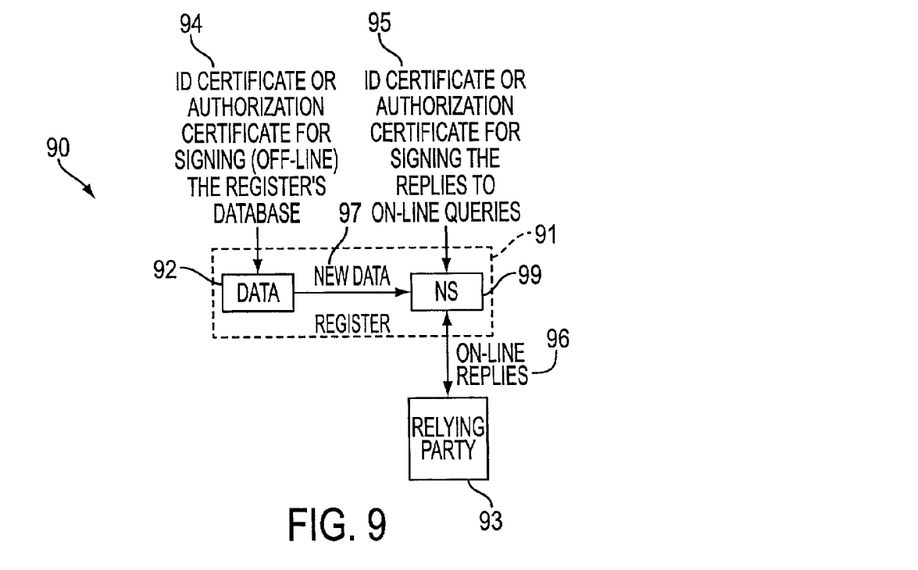
FIG. 9 is a block diagram of a secure register service in accordance with an aspect of the present invention.

Referring to FIG. 9, there is shown a block diagram of a secure register service 90 in accordance with an aspect of the present invention. Notary service 99 is running in a company or an organization 91 which may have no contracts with any CA. Service 99 confirms and signs for the validity of certain kind of documents which may also be public key certificates.

Note that register 91 has two signing keys: (1) off-line key 94 that is used to sign the most recent state of database 92; (2) on-line key 95 which is used to sign replies to on-line 96 queries received by relying parties 93. This is for security reasons—signing something off-line is easier to secure, whereas on-line replies conventionally provide more up-to-date data 97.

Protocols described elsewhere herein may be used to provide such service 90.

Hierarchical PKI

Figure 10:
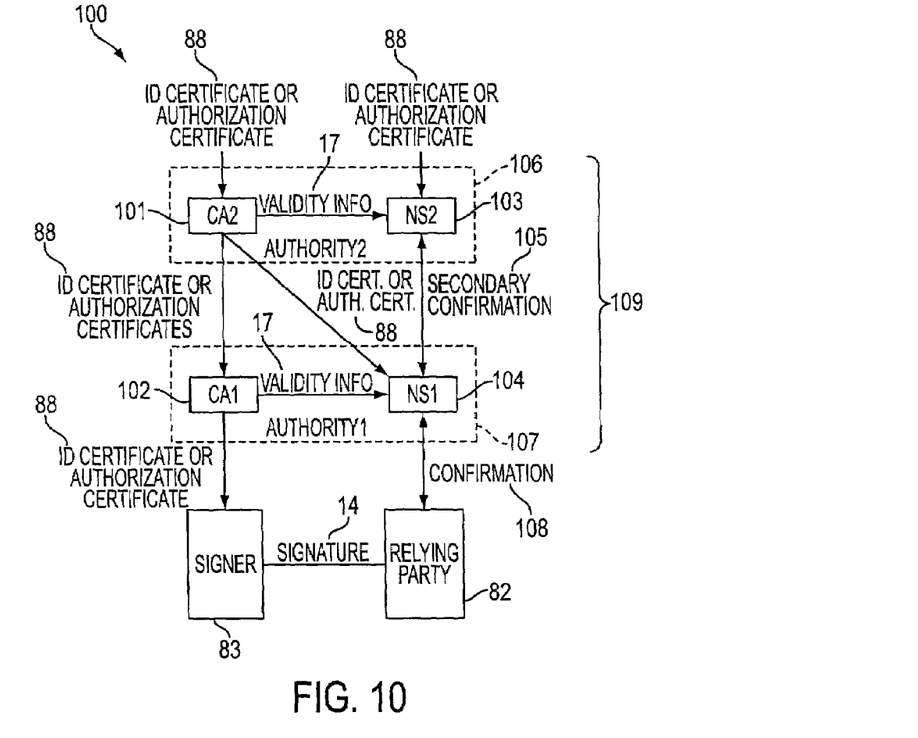
FIG. 10 is a block diagram of a hierarchical PKI service in accordance with an aspect of the present invention.

Referring to FIG. 10, there is shown a block diagram of a hierarchical PKI service 100 in accordance with an aspect of the present invention. If authorities 106 and CA 107 are organized as a hierarchy 109 (possibly a tree) then notary service (NS) 104 of a CA 102 may obtain a secondary confirmation 105 from notary service NS 103 of another CA 101 that is one step higher in hierarchy 109. Secondary confirmation 105 would in some cases help to preserve evidentiary value of a document with a confirmation 108 of signature even if a private key of NS 104 is already compromised. Moreover, hierarchical PKI service 100 may be used in accordance with a hierarchical or multi-level PKI protocol described elsewhere herein. Furthermore, authority 107 may either be a register, a certification service or an authorization service, and authority 106 may either be a certification service or authorization service.

Global Notary Service

Figure 11:
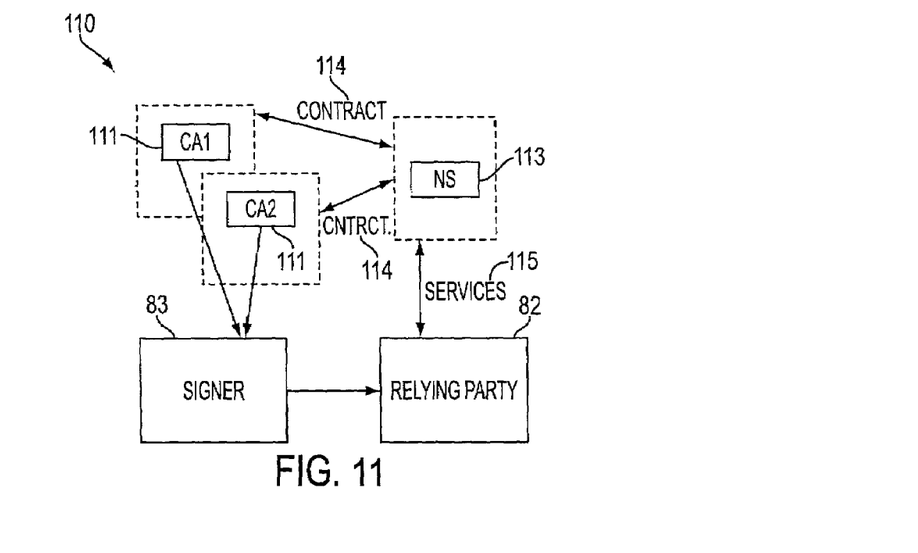
FIG. 11 is a global notary service in accordance with an aspect of the present invention.

Referring to FIG. 11, there is shown a global notary service 110 in accordance with an aspect of the present invention. Notary service 113 runs a server for confirming validity 115 of public-key certificates issued by one more CAs 111. Service provider 113 has a contractual relationship 114 with CA 111 or CAs 111 it serves. Protocols described elsewhere herein may be used to provide such service 110.

Although various embodiments which incorporate the teachings of the present invention have been shown and described in detail herein, those skilled in the art can readily devise many other varied embodiments that still incorporate these teachings. Accordingly, it should be understood that aspects of the present invention may be used to validate a digital signature for purposes of effecting electronic commerce, among other forms of activity over the Internet.

All trademarks are the property of their respective owners.

All headings are used for identifying locations in the specification and form no part of the description.

What is claimed is:

1. A system for verifying a digital signature, comprising:
a plurality of first computers each having a certificate of a set of certificates and a respective signed message signed in association with the certificate comprising a digest d wherein $d=h(h_1 \| h_{i+1})$ and $i$=each request;
a plurality of second computers in communication with the first computers and configured to receive respective certificates and associated signed messages; and
a third computer in communication with the second computers and configured to receive validation requests for the certificates and the signed messages from the plurality of second computers, the third computer configured to validate the certificates, to generate a certificate validation statements, and to provide each of the second computers an acknowledgement and a public key, the acknowledgement comprising in part a certificate validation statement, the signed message, a first proof portion having a confirmation associated with the certificate validation statement and the signed message in combination, and a second proof portion having a signed digest having the confirmation as part of a set of confirmations for the second computers, whereby ones acknowledgement comprises a response to the set of certificates of the first computers in the digest.

2. The system of claim 1 further comprising a fourth computer in communication with the third computer and configured to confirm at least a portion of the acknowledgement.

3. The system of claim 1 wherein the digest is a Merkle authentication tree.

* * * * *